United States Patent [19]
Harvey et al.

[11] Patent Number: 5,532,824
[45] Date of Patent: *Jul. 2, 1996

[54] OPTICAL MOTION SENSOR

[75] Inventors: Dennis N. Harvey, Victoria; Randal L. Jenniges, Bloomington, both of Minn.

[73] Assignee: MTS Systems Corporation, Eden Prairie, Minn.

[*] Notice: The term of this patent shall not extend beyond the expiration date of Pat. No. 5,463,463.

[21] Appl. No.: 430,425

[22] Filed: Apr. 28, 1995

Related U.S. Application Data

[63] Continuation of Ser. No. 186,310, Jan. 25, 1994, Pat. No. 5,463,463.

[51] Int. Cl.$^6$ ................................................ G01B 11/14
[52] U.S. Cl. ............................................ 356/375; 356/153
[58] Field of Search ............................. 356/375, 400, 356/401, 153, 150

[56] References Cited

U.S. PATENT DOCUMENTS

| | | | |
|---|---|---|---|
| 4,171,162 | 10/1979 | Gerard et al. | 356/401 |
| 4,392,744 | 7/1983 | Tatsuhama et al. | 356/153 |
| 4,419,013 | 12/1983 | Heimer | 356/401 |

OTHER PUBLICATIONS

"Automatic 6–D.O.F. Kinematic Trajectory Acquisition and Analysis," E. K. Antonsson et al, *Journal of Dynamic Systems, Measurement, and Con~rol*, vol. 111, Mar. 1989, pp. 31–39.

Brochure, "Autovision® 90 Machine Vision," Copyright 1990 by Automatix, Inc. et al., Billerica, MA 01821.

Brochure, "4–D–Imager," Intelligent Automation Systems, Inc., Cambridge, MA 02142.

Brochure, "Human Motion," Selspot Systems Ltd., Troy, MI 48083.

Brochure, "Selspot II—A Complete System for Sophisticated Motion Analysis," Selspot Systems Ltd., Troy, MI 48083.

Brochure, "OptoTrak/3000 Series Motion Measurement System," Northern Digital Inc., Waterloo, Ontario, Canada, Nov. 1991.

Brochure, "Contour Sensor," Perception, Framington Hills MI 48335.

*Primary Examiner*—Richard A. Rosenberger
*Attorney, Agent, or Firm*—Westman, Champlin & Kelly

[57] ABSTRACT

An apparatus determines the position of an object with respect to a reference coordinate system. Preferably, the apparatus includes a target attached to the object, the target moves within a defined region and has a surface with a first pattern thereon. A projection device projects a second pattern upon the surface. A sensing device provides an image signal indicative of the target surface including the first pattern and the second pattern. An analyzer receives the image signal and determines the position of the object based on the position of images of the first pattern and the second pattern.

16 Claims, 10 Drawing Sheets

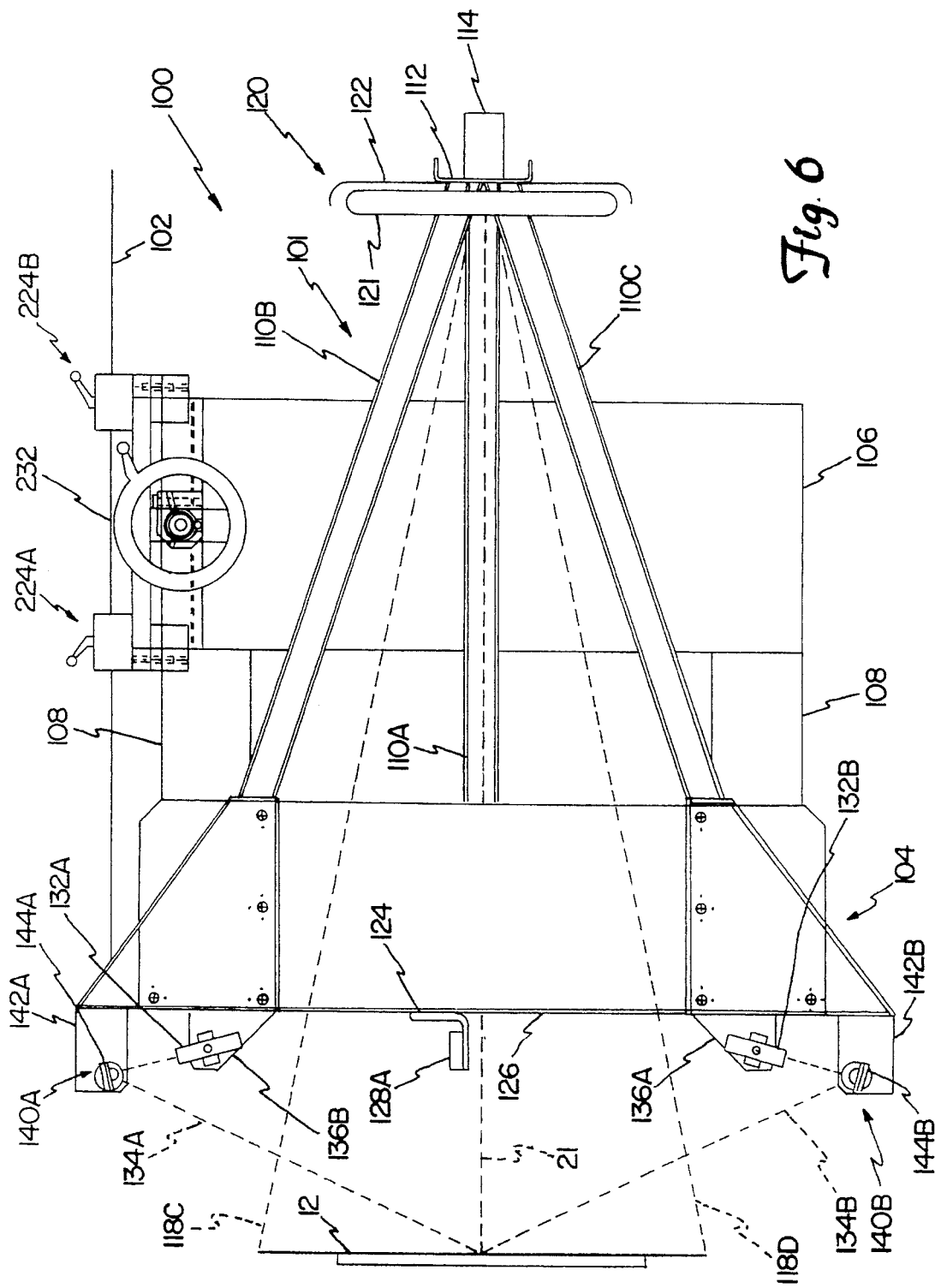

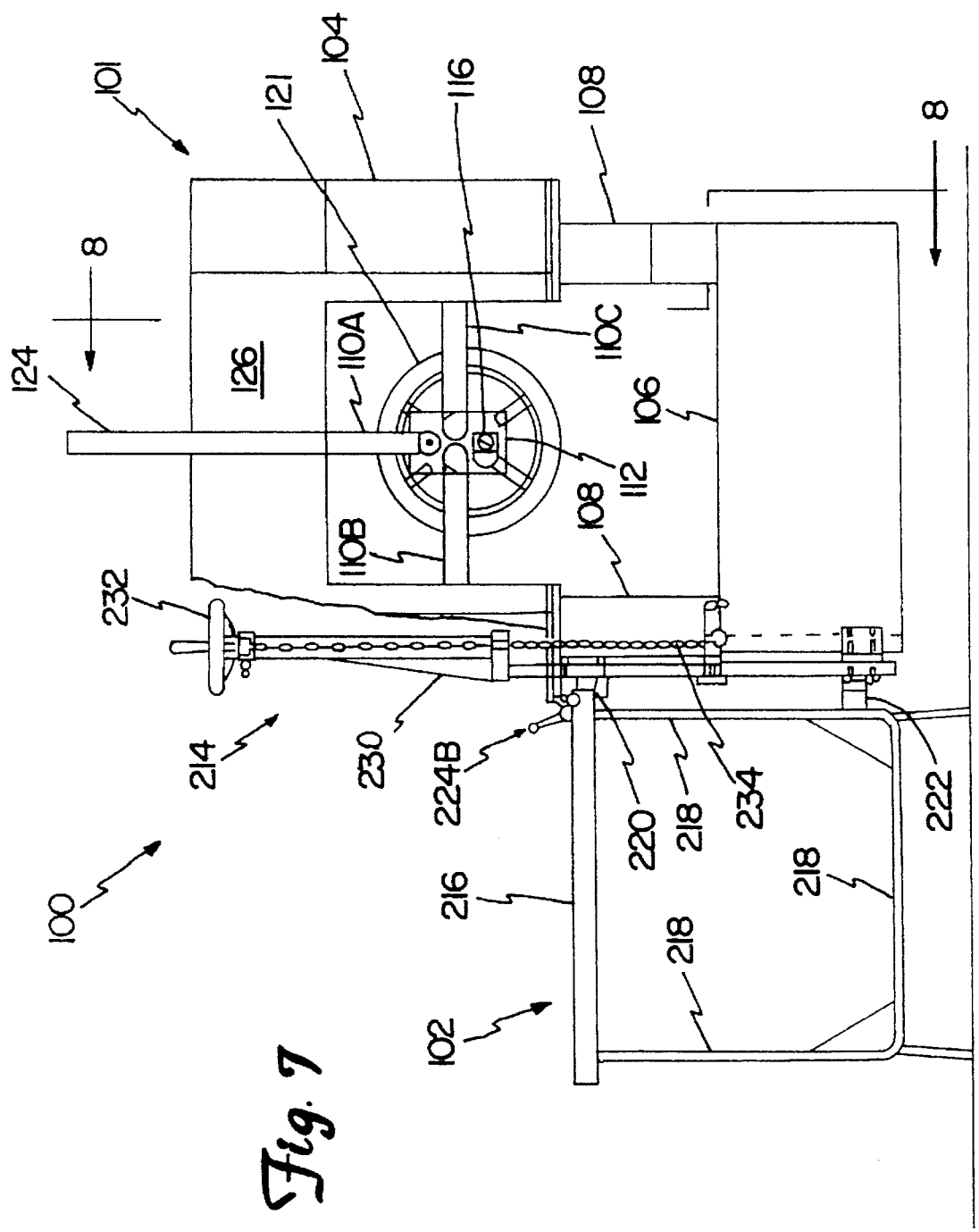

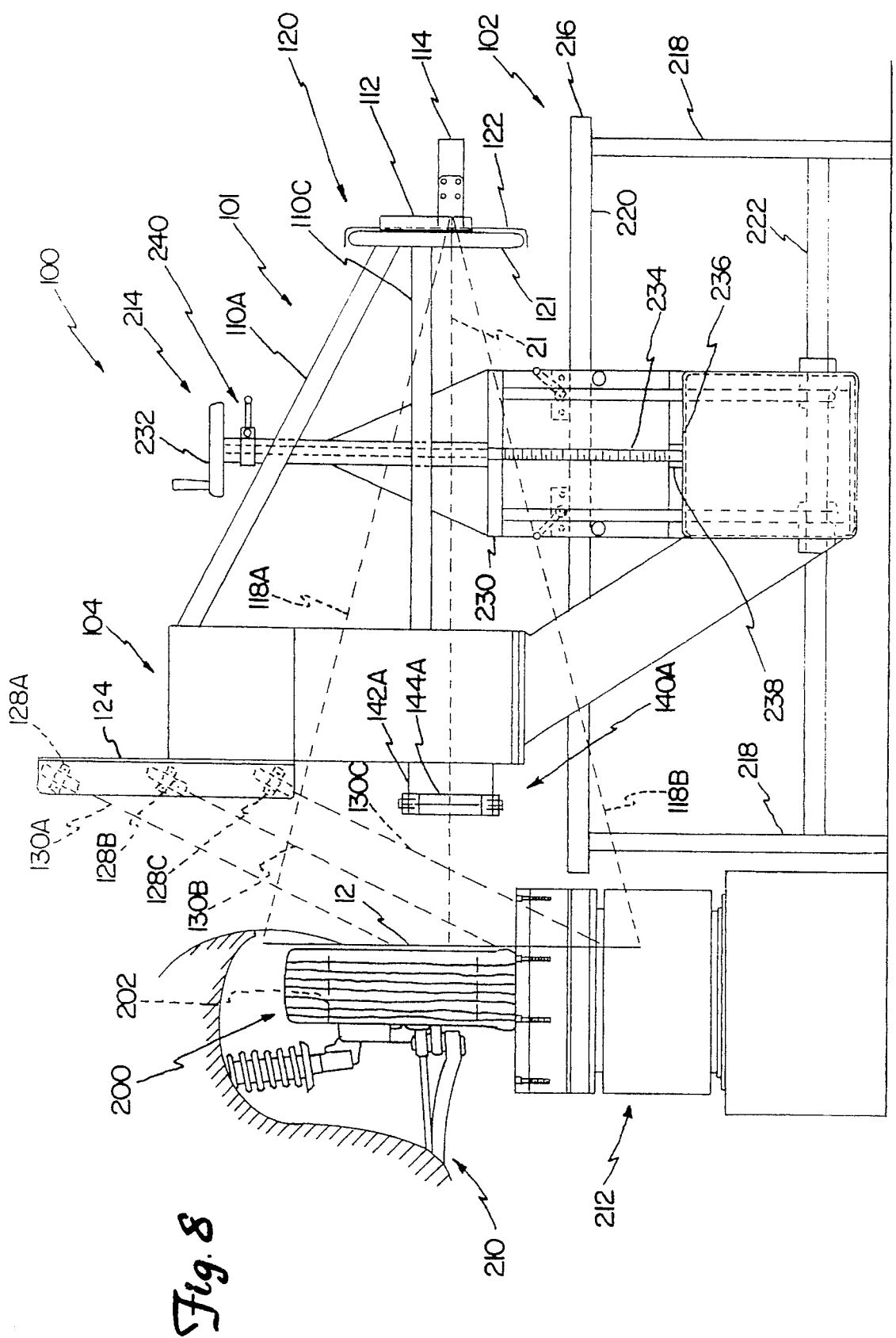

OPTICAL MOTION SENSOR

This is a continuation of application Ser. No. 08/186,310, filed Jan. 25, 1994.

BACKGROUND OF THE INVENTION

The present invention relates to object tracking systems for tracking an object in three dimensions. More particularly, the present invention relates to an apparatus using laser triangulation and passive tracking to determine the position of the object in three dimensions.

The efficient tracking of an object with six degrees of freedom has been a problem which has been faced by many in fields such as vehicle dynamics, biomechanics and robotics to name a few. A wide variety of apparatuses have been developed and used to varying levels of satisfaction. In many of these apparatuses, one or more markers have been placed on selected areas of the object to track its movement. Commonly, the position of the markers are viewed by stereo cameras placed at a known distance from each other. Using image processing, the position of the markers in each of the sensed images is determined and then processed to determine the position of the object in three dimensions.

Although such systems have been used in industry, these systems have not always been convenient to use. Since two cameras are present, the calibration of the system is often long. Others require operation in a predefined region, or attachment of wires or tethers to the object of interest. Still others require off-line processing.

Therefore, there is a continuing need for motion sensor systems which are easier to use over a greater breadth of applications.

SUMMARY OF THE INVENTION

The present invention is an apparatus for determining a position of an object moving within a defined region with respect to a reference coordinate system. Preferably, the apparatus includes a target attached to the object, the target moves within a defined region and has a surface with a first pattern thereon. A projection device projects a second pattern upon the surface. A sensing device provides an image signal indicative of the target surface including the first pattern and the second pattern. An analyzer receives the image signal and determines the position of the object based on the position of the images of the first pattern and the second pattern.

In a preferred embodiment, the object has a surface with at least one, but preferably, two spaced-apart points. First and second line generators generate line segments upon the target surface. As the target rotates about two perpendicular reference axes, the line segments rotate upon the target surface. By tracking both the points and the line segments, the position of the target and any object attached thereto can be ascertained.

In a further preferred embodiment, the line generators comprise laser stripe projectors which project laser lines upon the target surface. A camera along one of the reference axes senses the movement of the target within its field of view. The camera provides an image signal to an analyzing circuit which processes the image to ascertain that portion of the image which includes the target and in particular the points and the laser line segments. Translation along two of the axes and rotation about the third axis corresponding to the optical axis of the camera is obtained by tracking the motion of the points. Whereas, rotation about the first two axes and displacement along the optical axis is obtained by measuring movement of the laser line segments.

BRIEF DESCRIPTION OF THE DRAWINGS

FIG. 6 is a top plan view of an embodiment of the optical motion sensor of the present invention;

FIG. 7 is the front elevational view of the embodiment of FIG. 6; and

FIG. 8 is a side elevational view taken along lines 8–8 of FIG. 7;

DETAILED DESCRIPTION OF THE PREFERRED EMBODIMENTS

Figure 1:
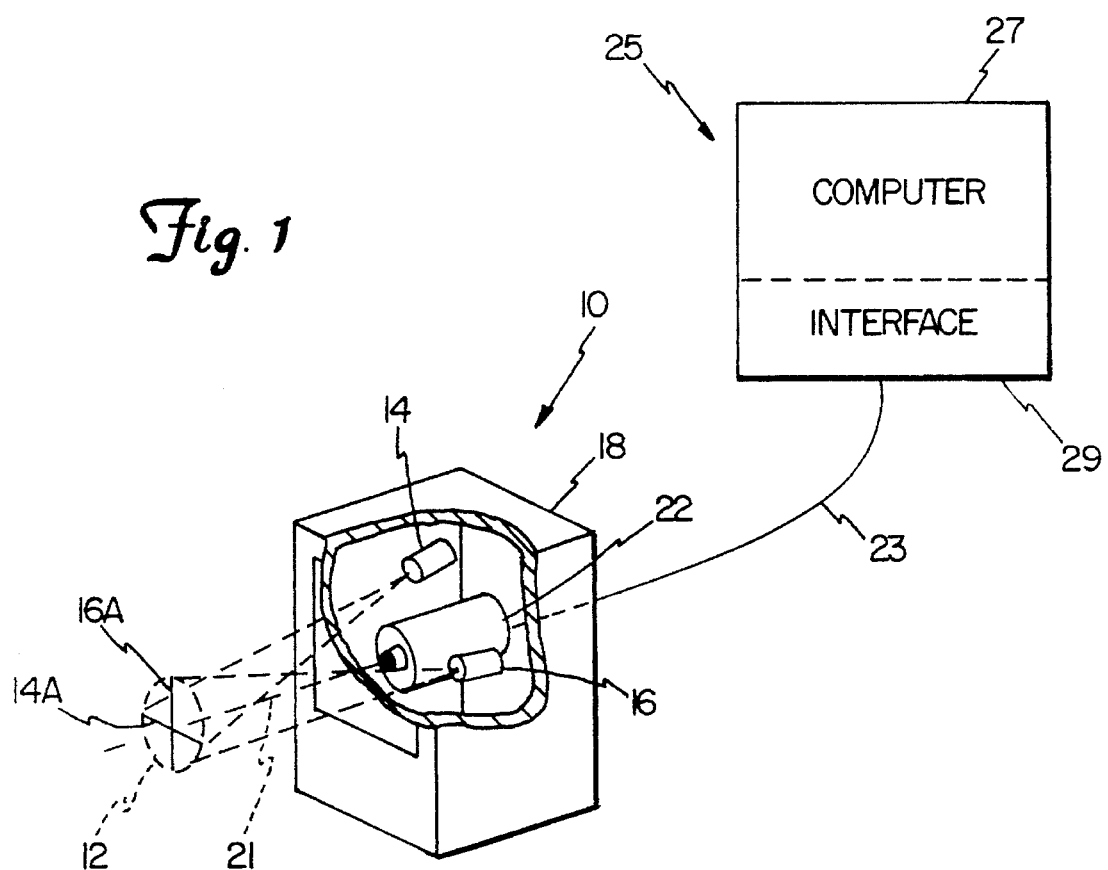
FIG. 1 is a schematic representation of an optical motion sensor, of the present invention.

The optical motion sensor of the present invention is illustrated schematically in FIG. 1 generally at 10. The optical motion sensor 10 in the preferred embodiment simultaneously measures three translational movements and three rotational movements of a target 12 illustrated in FIG. 2. Generally, the optical motion sensor 10 includes a camera 22 and two laser stripe projectors 14 and 16, preferably class II lasers, mounted in a suitable support structure 18. The laser stripe projector 14 projects a first laser line 14A upon the target 12. The second laser stripe projector 16 projects a second laser line 16A upon the target 12, which in a nominal position is substantially perpendicular to the first laser line 14A. The target 12 has a surface 13 that includes a pattern thereon embodied herein as dots 18 and 20.

Figure 2:
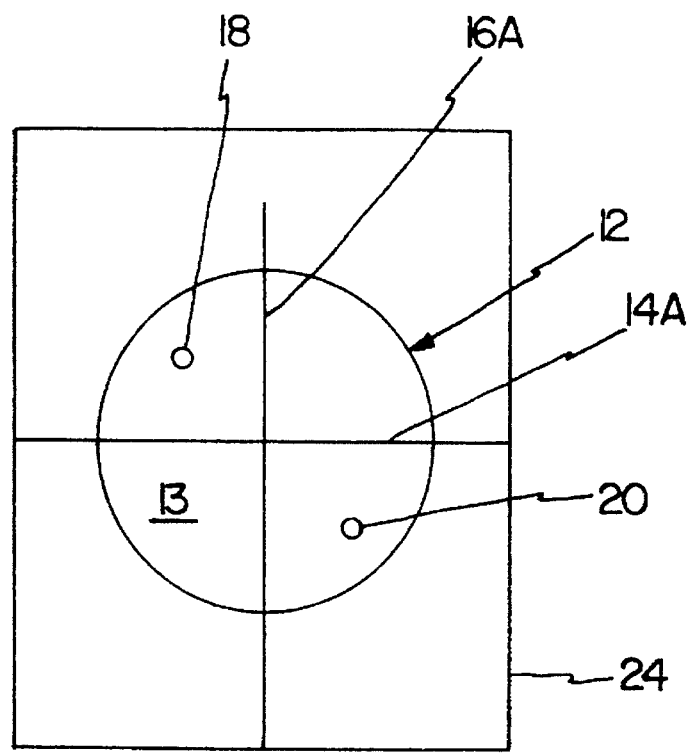
FIG. 2 is a schematic representation of a target in a field of view of a camera of the present invention.

Referring back to FIG. 1, the camera 22 is mounted to the support structure 18 and has an optical axis 21 aligned toward the target 12. The camera 22 monitors the target 12 providing a representative output image signal along a signal line 23 corresponding to the image as seen in its field of view 24 (FIG. 2). The image signal is provided to a suitable analyzing circuit represented generally at 25. Preferably, the camera 22 is a CCD camera and provides an image signal comprising successive frames corresponding to the field of view 24. The image signal is provided to the analyzing circuit 25 wherein the successive frames are analyzed to locate that portion of each frame corresponding to the target 12, and in particular the laser lines 14A and 16A, and the reference dots 18 and 20. By monitoring the position of the target 12 through the reference dots 18 and 20 within the field of view 24 as well as the position of the laser stripe lines 14A and 16A projected on the target 12, discussed below, the optical motion sensor 10 can ascertain the position or change in position of the target 12 as well as a desired object attached thereto.

In the preferred embodiment, the analyzing circuit 25 is a suitable computer 27 having known algorithms for detection of objects from a camera signal. Typically, the computer 27 includes a suitable interface circuit 29 to transfer the image signal from the camera 22 to the computer 27. The interface circuit 29 can be a separate card commonly known as a "frame grabber" card. In practice, an image processor, which includes a frame grabber circuit, grabs, processes and analyzes each frame of the image signal. The results are then transferred to the computer 27 prior to grabbing the next image frame. One manufacturer of the image processor 29 is Automatix, Inc. of Billerica, Mass.

Figure 3:
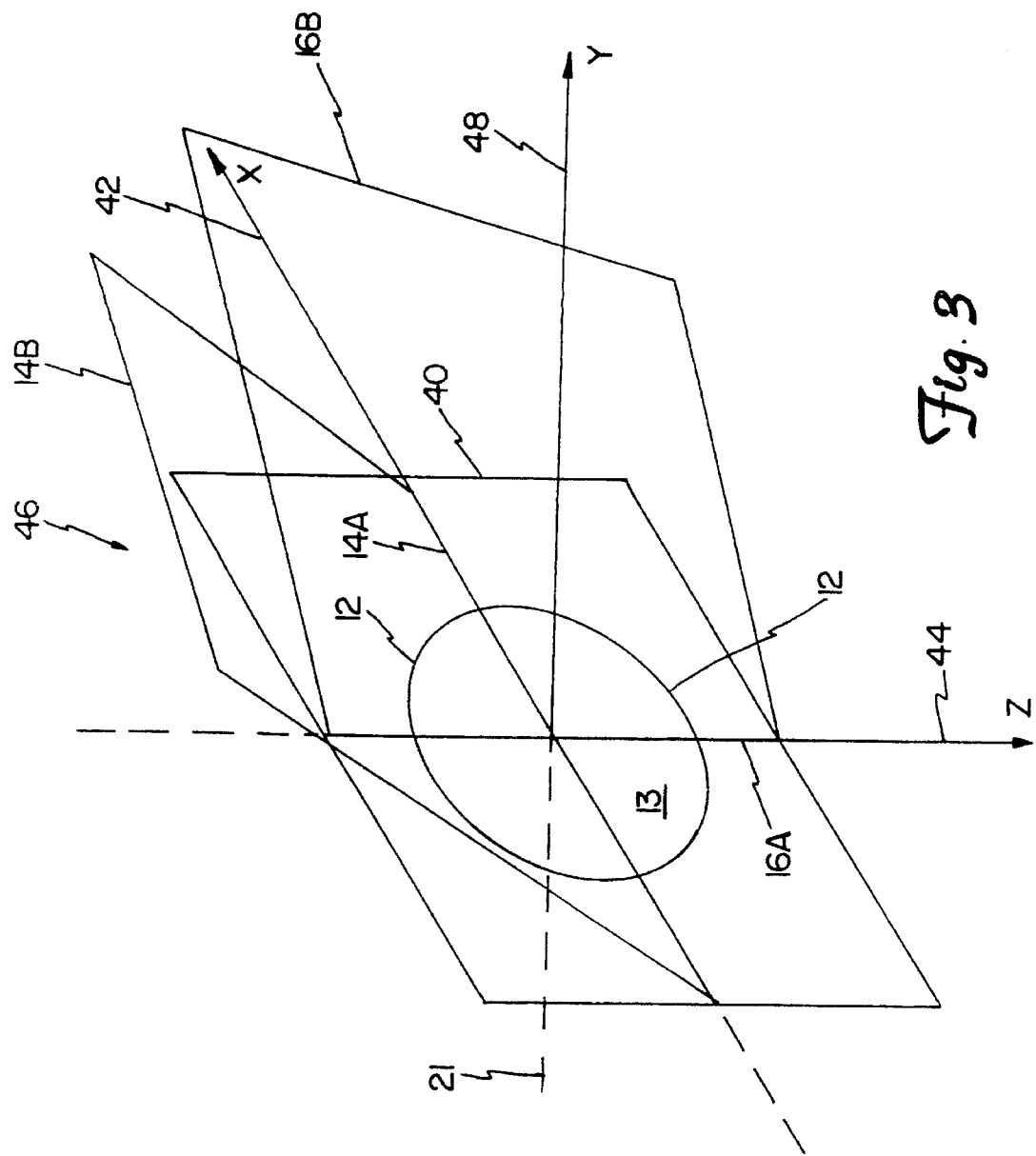
FIG. 3 is a perspective view of the target in a first position.
Figure 4:
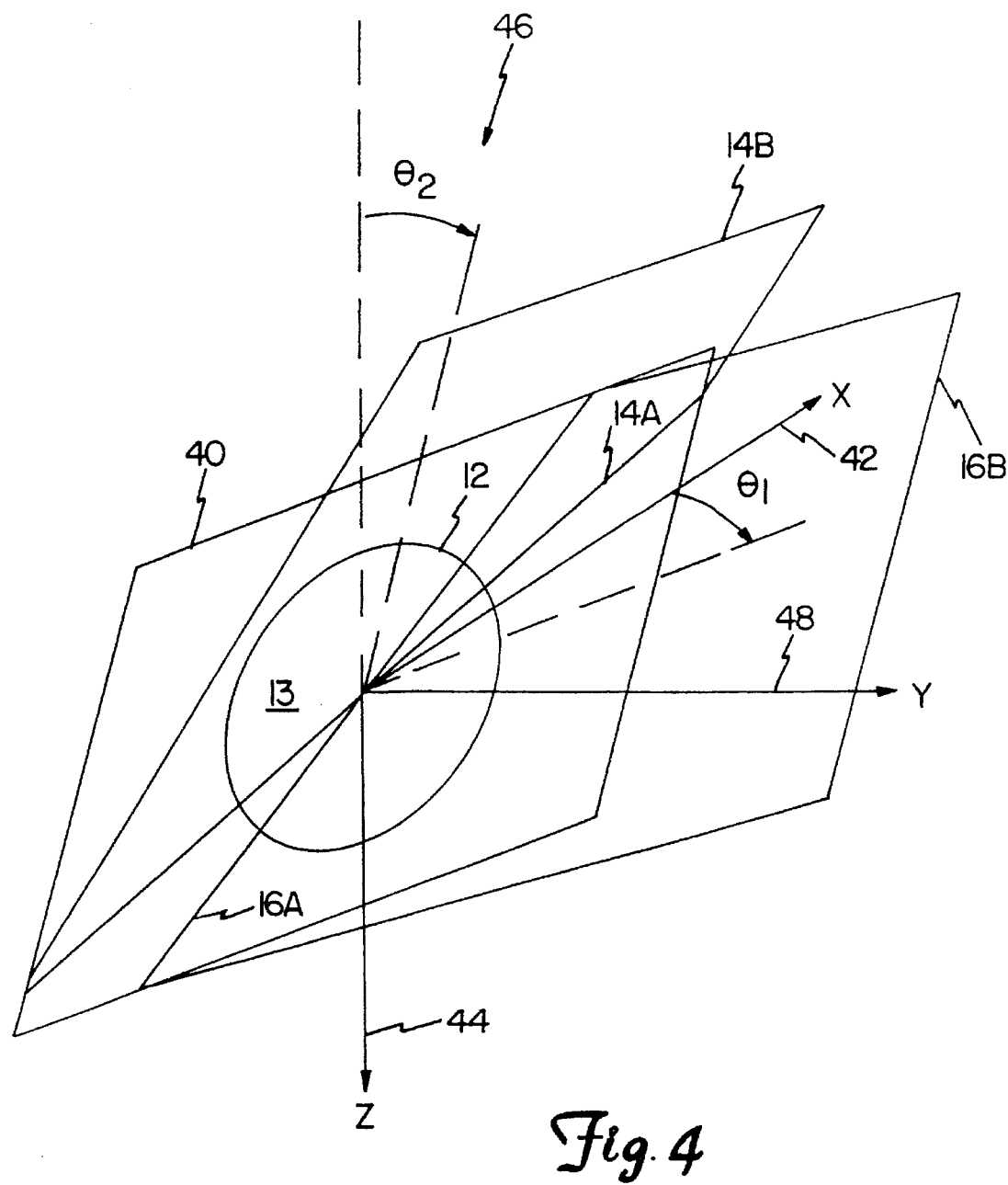
FIG. 4 is a perspective view of the target in a second position.

FIGS. 3 and 4 illustrate movement of the laser lines 14A and 16A as the target 12 rotates about two perpendicular reference axes. Referring to FIG. 3, the target 12 with surface 13 is in a first position and lies in a target plane 40 aligned with an axis (X-axis) 42 and a perpendicular axis (Z-axis) 44 of a reference coordinate system 46 that includes an orthogonal axis 48 (Y-axis) that is aligned on the optical axis 21 of the camera 22. The laser projection 14B from laser 14 is inclined to the X–Y plane and intersects with the target plane 40 to form the line 14A on the surface 13 parallel to the X–Z plane. Similarly, the laser projection 16B from laser 16 is inclined to the Z–Y plane and intersects with the target plane 40 to form the line 16A on the surface 13 parallel to the X–Z plane. The angles of inclination are selected based on range and resolution requirements. The reference coordinate system 46 includes three mutually orthogonal axes as is used herein for illustrative purposes. Other coordinate systems, for example, those using cylindrical, spherical or polar coordinates could also be used.

Referring now to FIG. 4, the laser lines 14A and 16A appear to move upon the surface 13 of the target 12 with rotation of the target about the X-axis 42 and the Z-axis 44. In FIG. 4, the target 12, the surface 13, and the target plane 40 have been rotated about both the X-axis 42 and the Z-axis 44. Specifically, the target 12, the surface 13 and the target plane 40 have rotated about the Z-axis 44 by an angle indicated by $\theta_1$ which causes the intersection of the laser projection 14B and the surface 13 to change with rotation of the laser line 14A from horizontal to the position illustrated. Similarly, the target 12, the surface 13 and the target plane 40 have been rotated about the X-axis 42 by an angle indicated by $\theta_2$ which causes the intersection of the laser projection 16B and the surface 13 to change with rotation of the laser line 16A from vertical to the position illustrated. By observing and measuring movement of the laser lines 14A and 16A, rotation of the target 12 about the X-axis 42 and the Z-axis 44, and translation of the target 12 along the Y-axis 48 can be determined. By further observing and measuring movement of the reference dots 18 and 20, discussed below, the position or change in position of the target 12 within the reference coordinate system 46 can be calculated for all six degrees of freedom.

Figure 5A:
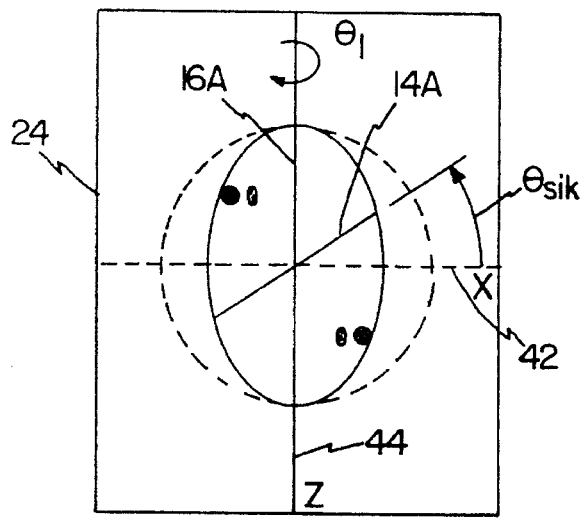
FIGS. 5A–5F are schematic representations illustrating displacement of the target with six degrees of freedom in the field of view of the camera.
Figure 5B:
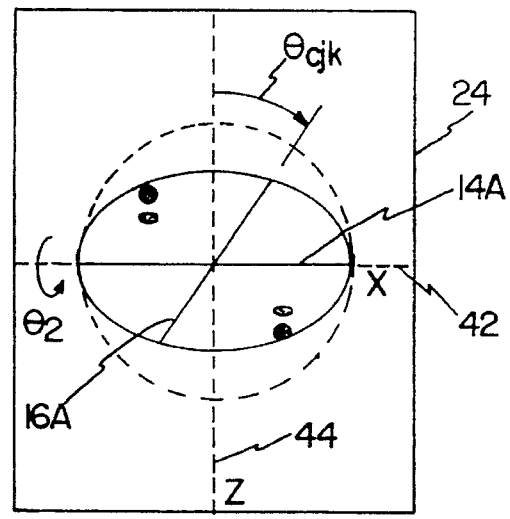
Figure 5C:
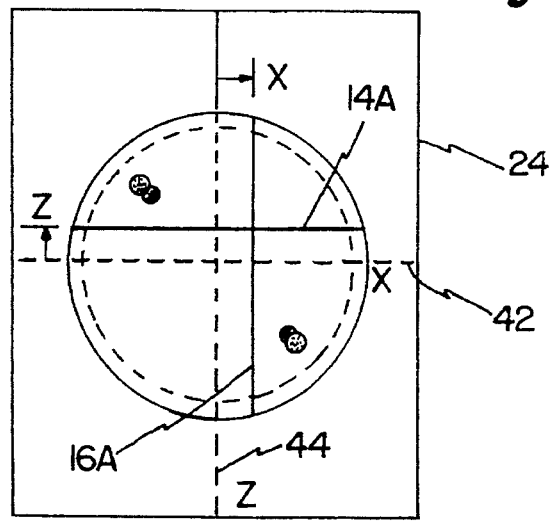

FIGS. 5A–5F are similar to FIG. 2 and generally illustrate the method for determining translational and rotational movement of the target 12 within the reference coordinate system 46. Referring first to FIGS. 5A through 5C, laser triangulation is used to determine rotation about the X-axis 42, the Z-axis 44 and translation along the Y-axis 48. As stated above, as the target 12 rotates, the intersection of the target plane 40 with the laser line projections 14B and 16B will cause the laser stripe lines 14A and 16A to rotate. The slope and intercepts of the lines are used to calculate the rotation about the X-axis 42, the Z-axis 44 as well as the translation along the Y-axis 48. FIG. 5A illustrates rotation of the laser stripe line 14A by an angle $\theta_{sik}$ with rotation of the target 12 about the Z-axis 44 through an angle $\theta_1$. Similarly, rotation of the target 12 about the X-axis 42 through an angle $\theta_2$ is determined by rotation of the laser stripe line 16A from its vertical position to an angle $\theta_{cjk}$ as illustrated in FIG. 5B. FIG. 5C illustrates translation of the target 12 along the Y-axis 48 wherein the laser stripe line 14A and the laser stripe line 16A translate vertically and horizontally, respectively, upon movement of the target 12 along the Y-axis 48. It should be understood that the projection of individual line segments is but one pattern that can be used. For instance, the projected pattern could be a series of light points which define a line. Other projected patterns that have elements which appear to move with movement of the target could also be used. With reference back to FIGS. 3 and 4, the projected pattern is used to determine the position of the target plane 40 in the reference coordinate system 46.

Figure 5D:
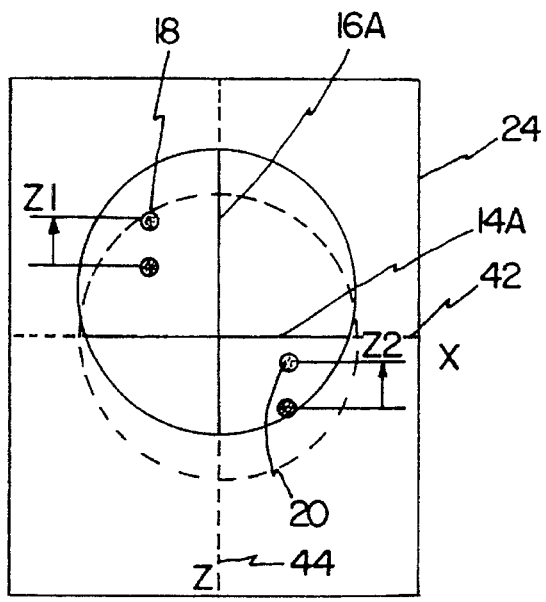
Figure 5E:
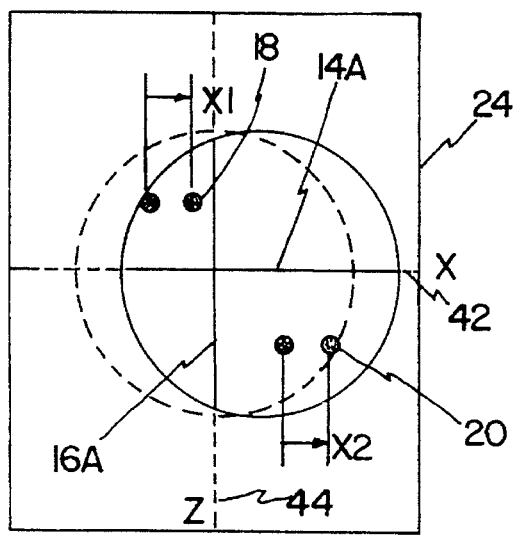
Figure 5F:
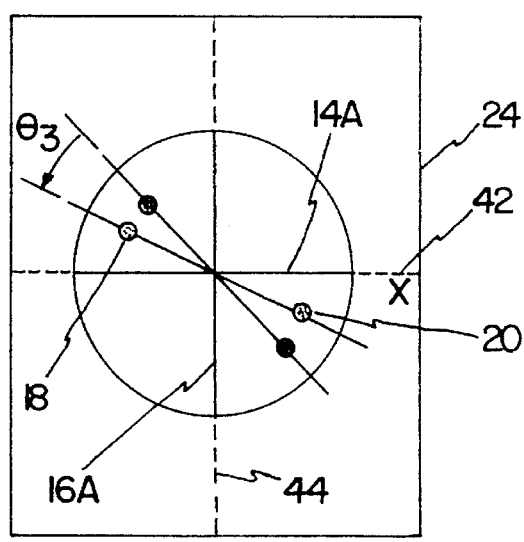

FIGS. 5D–5F illustrate passive target tracking to determine translation of the target 12 along the X-axis 42 and the Z-axis 44, and rotation of the target 12 about the Y-axis 48. FIG. 5D illustrates translation along the Z-axis 44 wherein displacement of the target 12 corresponds to equal displacement of both reference points 18 and 20 parallel to the Z-axis 44. Similarly, translation of the target 12 along the X-axis 42 corresponds to equal displacement of the reference points 18 and 20 in FIG. 5E. FIG. 5F illustrates rotation of the target about the Y-axis 48 (indicated by angle $\theta_3$) wherein rotation of the target 12 corresponds to equal and opposite vertical and horizontal displacement of the reference points 18 and 20. It should be understood that two spaced-apart reference points are necessary in order to determine rotation about the Y-axis 48. If only one reference point were used, it would not be possible to differentiate between rotation about the Y-axis 48 and two translational movements along the X-axis 42 and the Z-axis 44.

It should also be understood that reference points 18 and 20 on the surface 13 of the target 12 is but one pattern that can be used for passive tracking. Other patterns such as intersecting line segments forming an "X" may also be used, if desired. By observing the position of the pattern on the surface 13, the position of the target 12 in the target plane 40 can then be determined.

A first embodiment of an optical motion sensor o system of the present invention is illustrated generally in FIGS. 6, 7 and 8 at 100. The optical motion sensor system 100 includes a carriage 101 mounted to a suitable frame 102. The carriage 101 includes an upper platen assembly 104 mounted to a lower crossbeam 106 with two inclined support columns 108. Three support members 110A, 110B and 110C extend backwardly from the upper platen assembly 104 and are mounted to a camera support plate 112. A camera 114 is mounted to the camera support plate 112 with the optical axis 21 projecting through an aperture 116. The camera 114 provides an image of the monitored region defined by dashed lines 118A, 118B, 118C and 118D in which the target 12 moves therein. If desired, a light source 120 is provided to illuminate the target 12. As illustrated, the light source 120 is a fluorescent ring bulb 121 positioned about the optical axis 21 and mounted to the camera support plate 112. A suitable reflector 122 directs the light forwardly to illuminate the target 12.

In the preferred embodiment, multiple laser stripe projectors are used to allow for increased movement of the target 12. As illustrated, a bracket 124 is secured to a surface 126 of the upper platen assembly 104. Three laser stripe projectors 128A, 128B and 128C are mounted to the bracket 124 to project laser stripe projections 130A, 130B and 130C in the monitored region and upon the target 12 when the target 12 intersects each respective laser stripe projection 130A–130C. Similarly, two laser stripe projectors 132A and 132B are used to project two vertical laser stripe projections 134A and 134B. As illustrated in FIG. 6, the vertical laser stripe projections 134A and 134B are directed upon the target 12 in a single line when the target 12 is at a given reference position.

Each laser stripe projector 132A and 132B is mounted on a corresponding bracket 136A and 136B. The laser stripe projection 134A is reflected off a mirror assembly 140A. Referring to FIG. 8, the mirror assembly 140A includes a bracket 142A mounted to the upper platen assembly 104. A mirror 144A is mounted to the bracket 142A to receive the laser projection 134A from the laser stripe projector 132A and deflect it toward the target 12. A similar mirror assembly 140B having a mirror 144B and a bracket 142B receives the laser projection 134B from the laser stripe projector 132B and deflects it toward the target. By deflecting the laser projections 134A and 134B with the mirror assemblies 140A and 140B, the physical width of the entire assembly can be reduced without affecting the angle of incidence the laser projections 134A and 134B have with the target 12.

The optical motion sensor system 10 can be used to monitor the position of a particular object in a wide variety of applications. As illustrated in FIG. 8, the optical motion sensor system 100 can be used to ascertain the position or change in position of a wheel assembly 200 during active testing. In this embodiment, the target 12 is secured to a wheel 202. The target 12 is a 15 inch diameter aluminum disk approximately 0.375 inches thick. The target surface 13 facing the camera 114 is painted satin white with two flat black 0.5 inch diameter dots. The wheel assembly 200 is attached to an automobile frame indicated generally at 210. An actuator assembly 212 applies force loads to the wheel assembly 200 during testing.

Preferably, the carriage 101 is moveable relative to the fixed frame 102. In the embodiment illustrated, the frame 102 includes a table 216 supported by suitable supports 218. The carriage 101 includes a vertical positioning assembly 214 that slides upon a first longitudinal guide 220 formed on an edge of the table 216 and a second longitudinal guide 222 mounted to the supports 218 below and parallel to the first longitudinal guide 220. Suitable clamping devices 224A and 224B mounted to the vertical positioning assembly 214 releasably secure the carriage 101 in a fixed position to the first longitudinal guide 220.

The vertical positioning assembly 214 allows the height of the carriage 101 to be adjusted. The vertical positioning assembly 214 includes a support plate 230 that slides upon the longitudinal guides 220 and 222. A handwheel 232 mounted to a suitable threaded rod 234 is rotateably mounted to the support plate 230. A remote end 236 of the threaded rod 234 threadably mates with a threaded support member 238 secured to the lower crossbeam 106. Rotation of the handwheel 232 and the threaded rod 234 adjusts the position of the threaded support member 238 upon the rod 34 thereby adjusting the height of the carriage 101 relative to the frame 102. A suitable locking device 240 locks the handwheel 232 securing the carriage 101 in place.

Each of the laser stripe projectors 128A–128C and 132A–132B produce corresponding laser lines upon intersection with the surface of the target 12. The slope and intercept of each of the lines as they intersect with the target 12 are interpreted by the analyzing circuit 25 to obtain the angle of rotation about the X-axis 42 and the Z-axis 44, and the translation of the target 12 along the Y-axis 48. The location of the reference points 18 and 20 are interpreted by the analyzing circuit 25 to obtain the rotation about the Y-axis 48 and translations along the X-axis 42 and the Z-axis 44.

Figure 9:
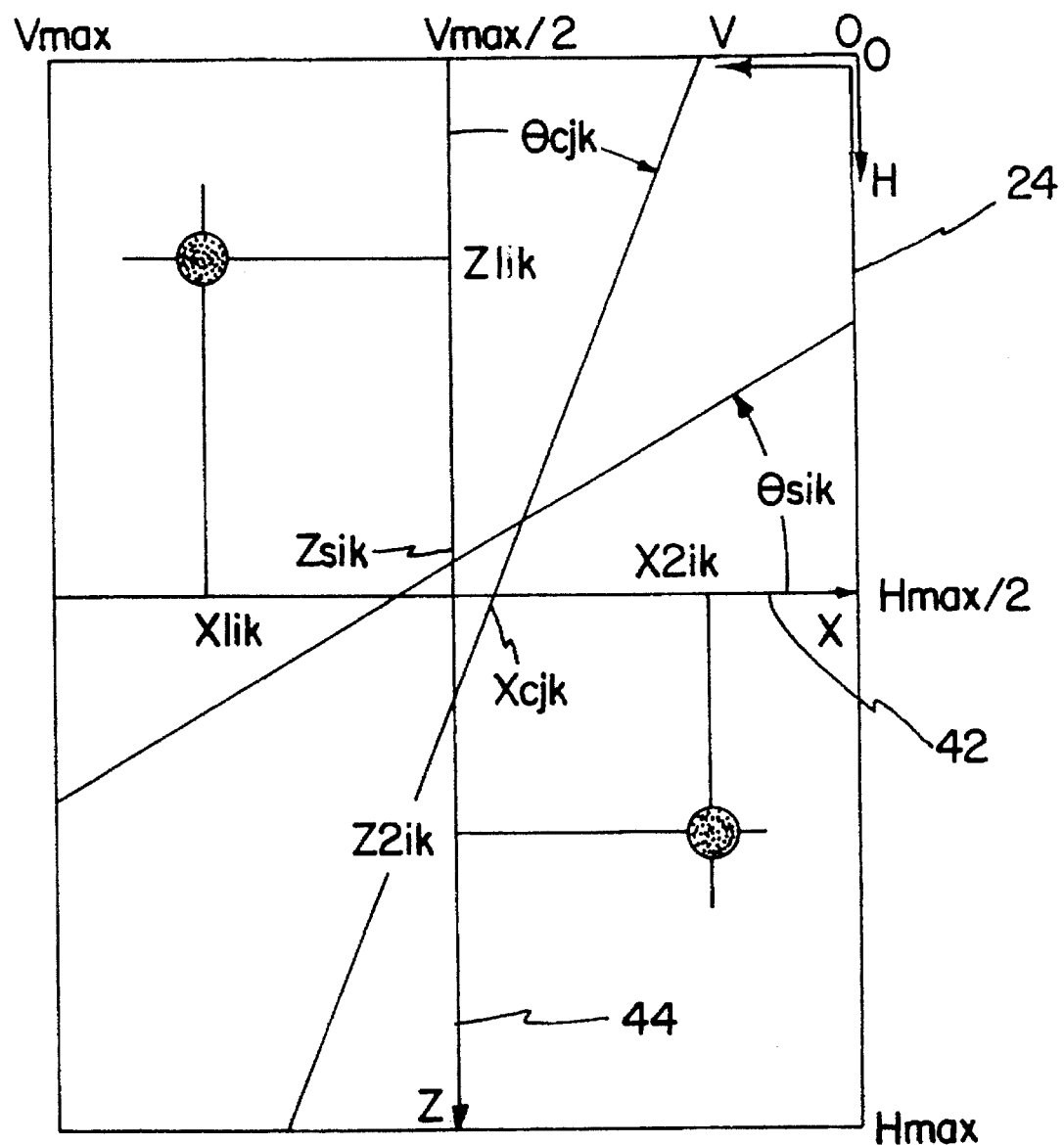
FIG. 9 is a schematic representation of an image coordinate system.

The following equations are used to compute the target 12 and the wheel assembly 200 position and angular orientation. The coordinate system for the target 12 is illustrated in FIG. 3. The coordinate system of the image as viewed by the camera 114 is illustrated in FIG. 9.

Wheel Assembly Motion Equations

The following equations are used to compute the target 12 position and angular orientation.

Steer Angle (rotation of wheel about Z-axis 44) from the laser line images is given by the following equation.

$$\theta_1 = a\tan\left[\frac{(\tan\theta_{sik} - \tan\epsilon_{si})\tan\theta_{cj} - \tan\theta_{sik}\tan\theta_{si}(\tan\theta_{cjk} + \tan\epsilon_{cj})}{\tan\theta_{si}\tan\theta_{cj}(1 - \tan\theta_{sik}\tan\theta_{cjk})}\right]$$

Camber Angle (rotation of wheel about X-axis 42) from the laser line images is given by the following equation.

$$\theta_2 = a\tan\left[\frac{(\tan\theta_{cjk} - \tan\epsilon_{cj})\tan\theta_{si} - \tan\theta_{cjk}\tan\theta_{cj}(\tan\epsilon_{si} - \tan\theta_{sik})}{\tan\theta_{si}\tan\theta_{cj}(1 - \tan\theta_{sik}\tan\theta_{cjk})}\right]$$

The intersection of the line formed by the intersection of the steer laser projection 14B, target 12 and the y-z plane can be computed from the following equation.

$$y_{int} = \frac{z_{si} - k_y Y_0 z_{sik}}{\tan\theta_{si} - k_y z_{sik}}$$

Intersection of the target surface plane 40 with the Y-axis 48 is given by the following equation.

$$y_t = \frac{(z_{si} - k_y Y_0 z_{sik})(1 - k_y z_{sik}\tan\theta_2)}{(\tan\theta_{si} - k_y z_{sik}) + k_y Y_0 z_{sik}\tan\theta_2}$$

Location of the reference point 18 is given by the following equations.

$$x_1 = \frac{k_y(Y_0 - y_t)x_{1ik}}{1 + k_y(x_{1ik}\tan\theta_1 - z_{1ik}\tan\theta_2)}$$

$$y_1 = \frac{y_1 + k_y(Y_0 - y_t)(x_{1ik}\tan\theta_1 - z_{1ik}\tan\theta_2)}{1 + k_y(x_{1ik}\tan\theta_1 - z_{1ik}\tan\theta_2)}$$

$$z_1 = \frac{k_y(Y_0 - y_t)z_{1ik}}{1 + k_y(x_{1ik}\tan\theta_1 - z_{1ik}\tan\theta_2)}$$

Location of the reference point 20 is given by the following equations.

$$x_2 = \frac{k_y(Y_0 - y_t)x_{2ik}}{1 + k_y(x_{2ik}\tan\theta_1 - z_{2ik}\tan\theta_2)}$$

$$y_2 = \frac{y_1 + k_y(Y_0 - y_t)(x_{2ik}\tan\theta_1 - z_{2ik}\tan\theta_2)}{1 + k_y(x_{2ik}\tan\theta_1 - z_{2ik}\tan\theta_2)}$$

$$z_2 = \frac{k_y(Y_0 - y_t)z_{2ik}}{1 + k_y(x_{2ik}\tan\theta_1 - z_{2ik}\tan\theta_2)}$$

Location of the center of target 12 is given by the following equations:

$$X_{ct} = \frac{(x_1 + x_2)}{2}$$

$$y_{ct} = \frac{(y_1 + y_2)}{2}$$

$$z_{ct} = \frac{(z_1 + z_2)}{2}$$

Rotation of the target 12 about the Y-Axis 48 is given by the following equation.

$$\theta_3 = a\tan\left[\frac{(x_1 - x_2)\cos\theta_2}{(z_1 - z_2)\cos\theta_1}\right]$$

Translation to the wheel assembly center 220 located a distance L from the target surface is given by the following equations.

$$x_c = \frac{x_{ct} + L\cos\theta_2 \sin\theta_1}{\sqrt{(\cos^2\theta_1 + \sin^2\theta_1 \cos^2\theta_2)}}$$

$$y_c = \frac{y_{ct} - L\cos\theta_2 \cos\theta_1}{\sqrt{(\cos^2\theta_1 + \sin^2\theta_1 \cos^2\theta_2)}}$$

$$z_c = \frac{z_{ct} - L\cos\theta_1 \sin\theta_2}{\sqrt{(\cos^2\theta_1 + \sin^2\theta_1 \cos^2\theta_2)}}$$

Definitions

Steer Laser Definitions:

i Index referring to a particular steer laser line projector 128A–128C.

$\theta_{si}$ Angle of steer laser i relative to the x-y plane as measured in the y-z plane.

$\epsilon_{si}$ Angle of line intersection formed by the steer laser plane and x-z plane relative to the x-axis 42 when the target 12 is parallel to the x-z plane. This is due to the azimuth alignment error for the steer laser.

$Z_{si}$ Intersection of the line formed by the intersection of the target plane 40 and the x-z plane and z-axis 44.

Camber Laser Definitions:

j Index referring to a particular camber laser line projector 132A–B.

$\theta_{cj}$ Angle of camber laser j relative to the y-z plane as measured in the x-y plane.

Angle of line of intersection formed by the camber laser plane j and x-z plane relative to the z-axis 44 when the target 12 is parallel to the x-z plane. This is due to the azimuth alignment error for the camber laser.

Laser Line Measurement Definitions:

k Index referring to a particular set of measurement data obtained during a single sample period (frame). This index can be used for any measured parameter.

$\theta_{sik}$ Steer Laser Image Angle of the line formed by the intersection of the wheel plane 40 and the steer laser plane relative to the line parallel to the x-axis 42 (horizontal line).

$Z_{sik}$ Steer Laser Line Image Offset Intersection of the line formed by the intersection of the target plane 40 and the steer laser plane and the z-y plane.

$\theta_{cjk}$ Camber Laser Line Image Angle Angle of the line formed by the intersection of the wheel plane 40 and the camber laser plane relative to the line parallel to the z-axis 44 (vertical line).

$X_{cjk}$ Camber Laser Line Image Offset Intersection of the line formed by the intersection of the target plane 40 and the x-z plane and the x-y plane.

$\theta_1$ Wheel steer angle about the z-axis 44 relative to the x-z plane.

$\theta_2$ Wheel steer angle about the x-axis 42 relative to the x-z plane.

Wheel steer angle about the z-axis 44 relative to the x-z plane when the target 12 is at its first measurement position. This is the target deviation from true zero steer angle.

$\theta_{20}$ Wheel steer angle about the x-axis 42 relative to the x-z plane when the target 12 is at its first measurement position. This is the target deviation from true zero camber angle.

$Y_{int}$ Intersection of the line formed by the intersection of the steer laser line projector and the target plane 40 and the y-z plane.

$Y_t$ Intersection of target plane 40 with the y-axis 48.

Object Tracking Definitions:

$Y_0$ distance between the camera 114 and the x-z plane along the y-axis 48.

$\Delta Y$ Lateral displacement of target 12 from x-z plane. Positive toward the camera 114.

$k_y$ Constant related to the expanding nature of the field of view 24 with distance from the camera 114 due to the camera optics.

D Physical distance between dots 18 and 20 on the target surface 13.

d Distance seen between the dots 18 and 20 by the camera 114.

$x_n$ x coordinate of dot number n.

$Y_n$ y coordinate of dot number n.

$z_n$ z coordinate of dot number n.

$x_{nik}$ x coordinate of image dot number n $z_{nik}$ z coordinate of image of dot number n.

$\theta_3$ Rotation of the target 12 about the y-axis 48 axis (CCW=positive)

$x_c$ x coordinate of wheel center.

$y_c$ y coordinate of wheel center.

$z_c$ z coordinate of wheel center.

$x_{ct}$ x coordinate of target center.

$y_{ct}$ y coordinate of target center.

$z_{ct}$ z coordinate of target center,

In summary, the present invention provides an apparatus well suited for tracking the position or change in position of an object with respect to three orthogonal axes. By using only a single camera, a suitable laser projector and a target surface that can be readily attached to the object or formed on a surface of the object, the apparatus is less complicated and suitable for many industrial applications.

Although the present invention has been described with reference to preferred embodiments, workers skilled in the art will recognize that changes may be made in form and detail without departing from the spirit and scope of the invention.

What is claimed is:

1. A method for determining a position of an object having a first pattern thereon, the object moving within a region with respect to a reference coordinate system, the method comprising the steps of:

projecting a second pattern upon a surface of the object;

sensing an image of the region including an image of the first pattern and an image of the second pattern, said image constituting a fixed defined portion of the region;

providing an image signal representing the image of the fixed defined portion of the region; and analyzing the image signal to detect positional changes of the image of the first pattern in the image of the fixed defined portion of the region and to detect positional changes of the image of the second pattern in the image of the fixed defined portion of the region and to ascertain the position of the object based on a position of the image of the first pattern in the image of the fixed defined portion of the region and on a position of the image of the second pattern in the image of the fixed defined portion of the region.

2. The method as specified in claim 1 and further comprising attaching a target to the object, the target having the first pattern thereon.

3. The method as specified in claim 1 wherein the image of the first pattern corresponds to the position of the object in a plane defined by the first pattern.

4. The method as specified in claim 3 wherein the image of the second pattern corresponds to the position of the plane in the reference coordinate system.

5. The method as specified in claim 1 wherein the step of analyzing includes detecting two line segments from the image of the second pattern.

6. The method as specified in claim 5 wherein the image signal represents a two dimensional image having two fixed orthogonal image axes, and wherein the step of analyzing includes determining an angle of slope and an intersection point with at least one of the image axes for each of the images of the line segments, and the position of the image of the first pattern with respect to the image axes.

7. The method as specified in claim 1 wherein the step of projecting includes projecting a first line segment and a second line segment upon the surface of the object.

8. The method as specified in claim 7 wherein the step of projecting includes projecting light from a laser.

9. The method as specified in claim 7 wherein the step of projecting includes projecting a third line segment substantially parallel to the first line segment.

10. The method as specified in claim 9 wherein the step of projecting includes projecting a fourth line segment substantially parallel to the second line segment.

11. The method as specified in claim 1 and wherein the step of projecting includes reflecting the second pattern off a reflector and to the surface of the object.

12. The method as specified in claim 1 wherein the first pattern comprises a reference point.

13. The method as specified in claim 12 wherein the first pattern comprises two spaced-apart reference points.

14. The method as specified in claim 1 wherein the step of sensing is with a single camera.

15. The method as specified in claim 1 wherein the reference coordinate system comprises three orthogonal axes and wherein the step of analyzing calculates the position of the object with respect to at least five degrees of freedom in the region.

16. The method as specified in claim 15 wherein the first pattern comprises two spaced-apart reference points and wherein the step of analyzing calculates the position of the object with respect to six degrees of freedom in the region.

* * * * *

UNITED STATES PATENT AND TRADEMARK OFFICE
CERTIFICATE OF CORRECTION

PATENT NO. : 5,532,824
DATED : July 2, 1996
INVENTOR(S) : Harvey et al.

It is certified that error appears in the above-indentified patent and that said Letters Patent is hereby corrected as shown below:

On title page, under item [56] "Other Publication"

Publication 7, replace "Perception" with --Perceptron--.

Column 7, line 45, insert --$\varepsilon_{cj}$-- before "Angle".

Column 8, line 5, insert --$\theta_{10}$-- before "Wheel".

Signed and Sealed this

Twenty-second Day of April, 1997

*Attest:*

BRUCE LEHMAN

*Commissioner of Patents and Trademarks*

*Attesting Officer*